Aug. 30, 1927.
S. C. CALDARA
1,641,141
VALVE
Filed April 13, 1927
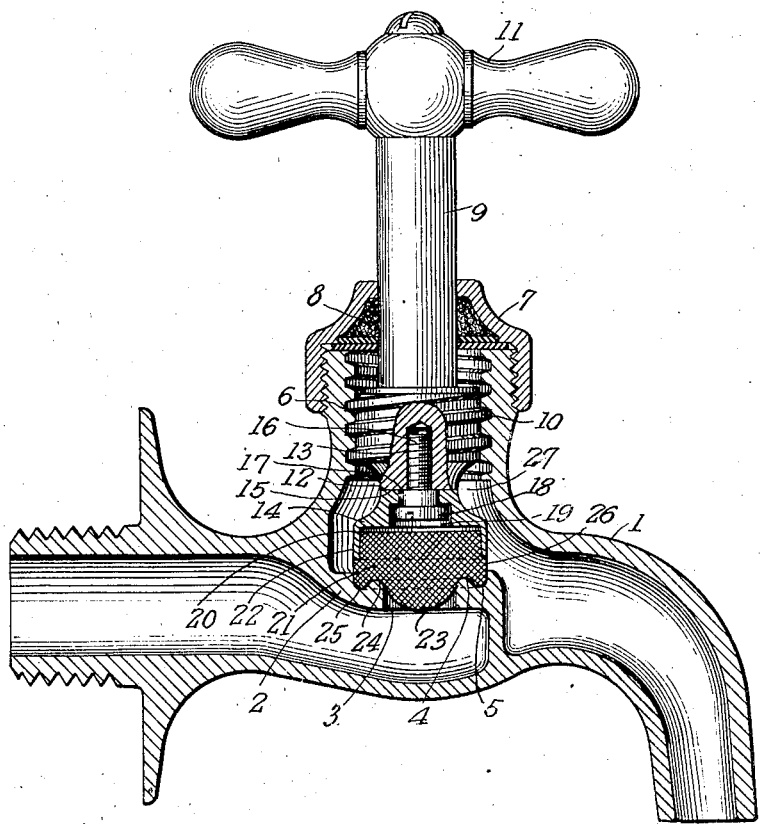
INVENTOR.
Salvatore C. Caldara
BY
Philip S. McLean
ATTORNEY Patented Aug. 30, 1927.

1,641,141

UNITED STATES PATENT OFFICE.

SALVATORE C. CALDARA, OF NEW YORK, N. Y.

VALVE.

Application filed April 13, 1927. Serial No. 183,316.

This invention relates to valves in the general nature of faucets and the like.

It is well known that faucets, particularly for hot water, have a great tendency to leak after a short use, due largely to the wearing of the washers. These washers are troublesome to change and require the shutting off of the water before the faucet can be taken apart for such renewal, so it is quite common for the leakage to be allowed to continue until it becomes too serious for further neglect.

The objects of this invention are to overcome these faults in prior valves and to provide a structure which will be relatively simple, inexpensive, easy to manufacture and assemble, durable, long-wearing and absolutely tight under all conditions.

These objects are attained by a novel construction, combination and relation of parts as hereinafter described and claimed.

The drawing accompanying and forming part of this specification illustrates a commercial form of the invention, the single view being a longitudinal section of a faucet having the features of the invention embodied therein.

The body of the faucet designated 1 is shown as having a partition 2 therein, provided with a port 3 surrounded by an upstanding curved rim 4, which in turn is surrounded by a curved groove 5, the rib and surrounding groove constituting a valve seat.

The neck of the faucet is internally screw threaded at 6 and is closed by a screw cap 7 having a gland or packing 8 for the valve stem.

The valve stem shown at 9 is illustrated as having an enlarged screw threaded head 10 and as provided with a suitable handle 11 for turning the same.

The screw head of the valve stem is shown as faced off with a wide flat surface 12 and as having a central longitudinally extending screw seat 13.

To the lower end of the valve stem there is applied a rotatable head 14 having a flat upper face 15 of the same diameter and in flat abutting engagement with the lower face 12 of the stem. The rotatable mounting of this head is effected by a screw shown as having a shank 16 engaged in the screw seat 13, an annular shoulder 17 in abutting engagement with the face 12 and a flat head 18 seating freely in a recess 19 in the under face of the rotatable head.

The head 14 is cupped on its under side to form a chamber 20 and the cavity for the screw head is sunk in the top of this chamber so that the screw head will not project into the chamber.

The valve proper consists in the illustration of a relatively thick disc 21 of lead or the like having its upper portion of reduced diameter to fit within the flange 22 of the cup. The lower face of this valve disc is shown as having a central protuberance 23 extending down into the valve port surrounded by a groove 24 fitting the rib of the valve seat and a dependent outer edge 25 fitting in the annular groove of the valve seat. The lower face of the valve member may be preformed in the shape described, but this is not essential in the case of lead or like material as the same will shape itself to the peculiar form of the valve seat.

In practice, the valve is assembled by placing the cupped head in abutting engagement with the smooth lower end of the valve stem and then inserting and turning the screw down into shouldered engagement in its seat. This secures the head rotatably on the end of the stem and the limitation afforded by the stop shoulder enables the screw to be set up absolutely tight without in any way binding or restricting the free rotation of the head. The valve disc is then mounted by inserting the reduced portion of the same into the cup of the head. This may be just a light frictional engagement sufficient to hold the disc in place for the time being, because as soon as the valve stem is entered in the valve body and screwed down to force the valve to its seat, the lead will be crowded up into the cup sufficiently to effect a "swaging" of the metal in the head which will hold the disc securely in place thereafter. The lower part of the disc is shown equal in diameter to the rim of the cup so as to overstand the edge of the cup, as indicated at 26, and thus prevent the edge of the cup from ever coming into engagement with the valve seat.

The wear on the valve is practically negligible as the valve does not turn, once it is carried into engagement with its seat and it leaves its seat also without turning. Practically the only wear, therefore, is that between the flat abutting surfaces of the valve stem and rotatable head and these surfaces are of ample width to take care of all such wear and to keep the valve "true". The meeting portions of the valve stem and head are shown as annularly grooved on a substantially semi-circular curvature at 27 so as to present a symmetrical form and provide ample clearance for flow about the valve.

The fact that the valve disc can be mounted by simply dropping it into the cup in the rotatable head is especially important as no tools are required and the fit between these parts need not be absolutely accurate as the subsequent pressure applied by the screw stem serves to fix the valve disc firmly in place. In this connection it will be noted that the lead is confined by the valve seat in a way to effect the squeezing of the valve material up into the cup, rather than to spread the material. The outer groove of the valve seat holds the material against lateral spreading while the raised rim of the valve seat exerts pressure to force the material up into the cup and to expand it within the cup. Should it become necessary to dissemble the valve this can be easily done by simply prying or pulling the disc out of the cup. The screw head is then exposed so that the screw can then be readily removed if that is desired. As the head of the screw is entirely seated in the upper end of the cup, the upper face of the disc may be left flat and so need not be finished or shaped in any special way.

What is claimed is:

1. In a faucet or like structure, a valve body having a port surrounded by an annular ridge which in turn is surrounded by an annular groove, said ridge and groove affording a valve seat, a valve stem having a screw engagement in the valve body over said seat and provided with a flat lower end having a screw seat therein, a cupped valve head having a flat upper end in abutting engagement with and of substantially the same diameter as the lower end of the valve stem, said cupped valve head having a depression in the center of the same, a screw having a shank engaged in the screw seat of the stem, a shoulder in abutment with the end of the valve stem and a head freely received in the depression in the valve head and a lead valve disc having a shouldered upper portion swaged within the cup of the valve head, the upper face of said valve disc being substantially flat and the lower face of said valve disc having an outer rim fitting in the groove of the valve seat, an annularly grooved portion within said rim fitting over the ridge of the valve seat and a central projection entering the port inside the valve seat.

2. In a valve of the character disclosed, a valve body having a port surrounded by a valve seat, a valve stem having a screw engagement in the valve body over said valve seat, a cupped valve head in rotary abutting engagement with the lower end of the valve stem, a screw extending through said valve head into the lower end of the valve stem, said screw having a projecting portion on which the valve head is freely swiveled and a head for rotatably confining the valve head to the valve stem, the extent of movement of the screw into the screw seat being limited to prevent the head of the screw from binding the valve head and interfering with free rotation of the same and a valve disc having characteristics of lead and having a portion of the same entered in the cup of the valve head and squeezed in frictional binding engagement within said cup by the pressure applied by the screw valve stem, there being clearance provided in the back of the cup between the head of the screw and the inner face of the valve disc to prevent engagement between the valve disc and screw upon relative rotation of the valve stem and valve head.

In witness whereof, I have hereunto set my hand this 9th day of April, 1927.

SALVATORE C. CALDARA.